United States Patent [19]
English et al.

[11] Patent Number: 5,997,162
[45] Date of Patent: Dec. 7, 1999

[54] HORIZONTAL HID VEHICLE HEADLAMP WITH MAGNETIC DEFLECTION

[75] Inventors: George J. English, Reading, Mass.; Michael D. Tucker, Henniker, N.H.; Jean M. Evans, North Hampton, N.H.; Harold L. Rothwell, Hopkinton, N.H.

[73] Assignee: Osram Sylvania Inc., Danvers, Mass.

[21] Appl. No.: 09/041,802

[22] Filed: Mar. 13, 1998

[51] Int. Cl.[6] .................................................. F21K 27/00
[52] U.S. Cl. ........................ 362/508; 362/265; 313/607; 313/156
[58] Field of Search ................................. 362/538, 508, 362/261, 265; 313/581, 607, 156

[56] References Cited

U.S. PATENT DOCUMENTS

| | | |
|---|---|---|
| 571,463 | 11/1896 | Thomson . |
| 2,042,140 | 5/1936 | Bunger . |
| 2,612,625 | 9/1952 | Hullegard . |
| 3,017,536 | 1/1962 | Irland . |
| 3,453,481 | 7/1969 | Schimmelpfennig . |
| 3,562,583 | 2/1971 | Zollweg . |
| 3,881,132 | 4/1975 | Miller . |
| 3,883,763 | 5/1975 | Kearney . |
| 3,988,626 | 10/1976 | Boudouris . |
| 4,434,385 | 2/1984 | Touho . |
| 4,698,547 | 10/1987 | Grossman et al. .................. 313/156 X |
| 4,720,660 | 1/1988 | Wheelan . |
| 4,871,947 | 10/1989 | Miyashita . |
| 4,987,521 | 1/1991 | Fratty et al. ............................... 362/61 |
| 5,057,747 | 10/1991 | Henderson . |
| 5,198,727 | 3/1993 | Allen . |
| 5,461,284 | 10/1995 | Roberts et al. ...................... 313/491 X |
| 5,589,726 | 12/1996 | Gold . |

FOREIGN PATENT DOCUMENTS 917066   1/1963   United Kingdom .

*Primary Examiner*—Laura K. Tso
*Attorney, Agent, or Firm*—William E. Meyer

[57] ABSTRACT

The efficiency of a horizontally operated arc discharge lamp has been found to be substantially improved by the application of a transverse magnetic field. The magnetic field moves the arc downward, away from the upper wall of the lamp envelope. The magnetic field moves the arc so that the outer mantel that otherwise would make contact with side walls of the envelope stand away from the envelope wall. With the arc withdrawn from the wall, less energy is lost in heating the envelope, resulting in more energy be directed to the emission of light.

22 Claims, 13 Drawing Sheets

HORIZONTAL HID VEHICLE HEADLAMP WITH MAGNETIC DEFLECTION

TECHNICAL FIELD

The invention relates to electric lamps and particularly to arc discharge electric lamps. More particularly the invention is concerned with magnetic deflection of a vehicle arc discharge lamp.

BACKGROUND ART

When an undeflected arc approaches the upper wall of an high intensity discharge (HID) lamp, particularly in small HID lamps, several detrimental effects occur. The envelope overheats, thereby emitting silicon that upsets the lamp chemistry. The silicon combines with the sodium, scandium and other materials, thereby changing the relative amount of iodine (halogen) present in the fill gas. This narrows the arc, causing it to extend higher and closer to the envelope wall. By recycling in this manner, the narrowed arc then tends to cut into the envelope wall causing a voltage rise, heating the lamp further. This process continues until the envelope wall either fails (bubbles out under the fill pressure) or devitrifies (cracks). There is a general need to increase the lamp life, and a particular need to counteract the wall erosion process in small HID lamps.

In vehicle headlamps systems, the lamps usually need to have at least two modes: low beam and high beam. Separate systems may be used, but this approximately doubles the required space, materials and overall cost of the lamp system. It is less expensive to combine them if possible. Vehicle HID systems are costly, although they can provide more, and higher quality light with long system life. A particular advantage to a vehicle HID system is that there is no delicate filament that may fail because of vehicle motion. There is then a general need for single lamps containing optionally selectable, multiple light sources offset from one another, and a particular need for a vehicle HID system with a single bulb providing optical source positions for both the high and low beams.

Increasing lamp efficiency is a continuing goal of lamp makers. In vehicles, headlamps may be the largest single power drain. The electrical system scale is then set to meet headlamp demand. By lowering headlamp demand, the overall scale of the electrical power supply (alternator, regulator, leads, fuses, control boxes, etc.) may be reduced. There is then a need to increase headlamp efficiency, and to reduce vehicle fuel consumption, size, weight and cost.

Magnetic deflection of horizontally operated vehicle HID lamp arcs is known. One system used a bifurcated electrode with a magnetic field system to switch the arc between the upper and lower electrode tip options.

DISCLOSURE OF THE INVENTION

A method and apparatus for shifting the operating location of an arc discharge lamp is disclosed. The arc lamp has a narrow enclosed volume containing an arc generally extending horizontally between a single tip first electrode and a single tip second electrode. An electromagnet is positioned to provide a magnetic field substantially transverse to the arc path. The lamp and magnet are then operated together by providing a first power state to sustain an arc discharge between the first electrode and the second electrode, and providing a second power state to power the electromagnet, the electromagnet power being such that the magnetic field is substantially continuously supplied during the arc generation under the first power state, and the electromagnet is positioned relative to the arc to deflect the arc column and to contract the arc mantel sufficiently to withdraw the arc mantel from contact with the envelop wall thereby increasing brightness and luminosity, and improving lamp life and color.

BRIEF DESCRIPTION OF THE DRAWINGS

Like reference numbers designate like or corresponding parts throughout the drawings and specification.

BEST MODE FOR CARRYING OUT THE INVENTION

Figure 1:
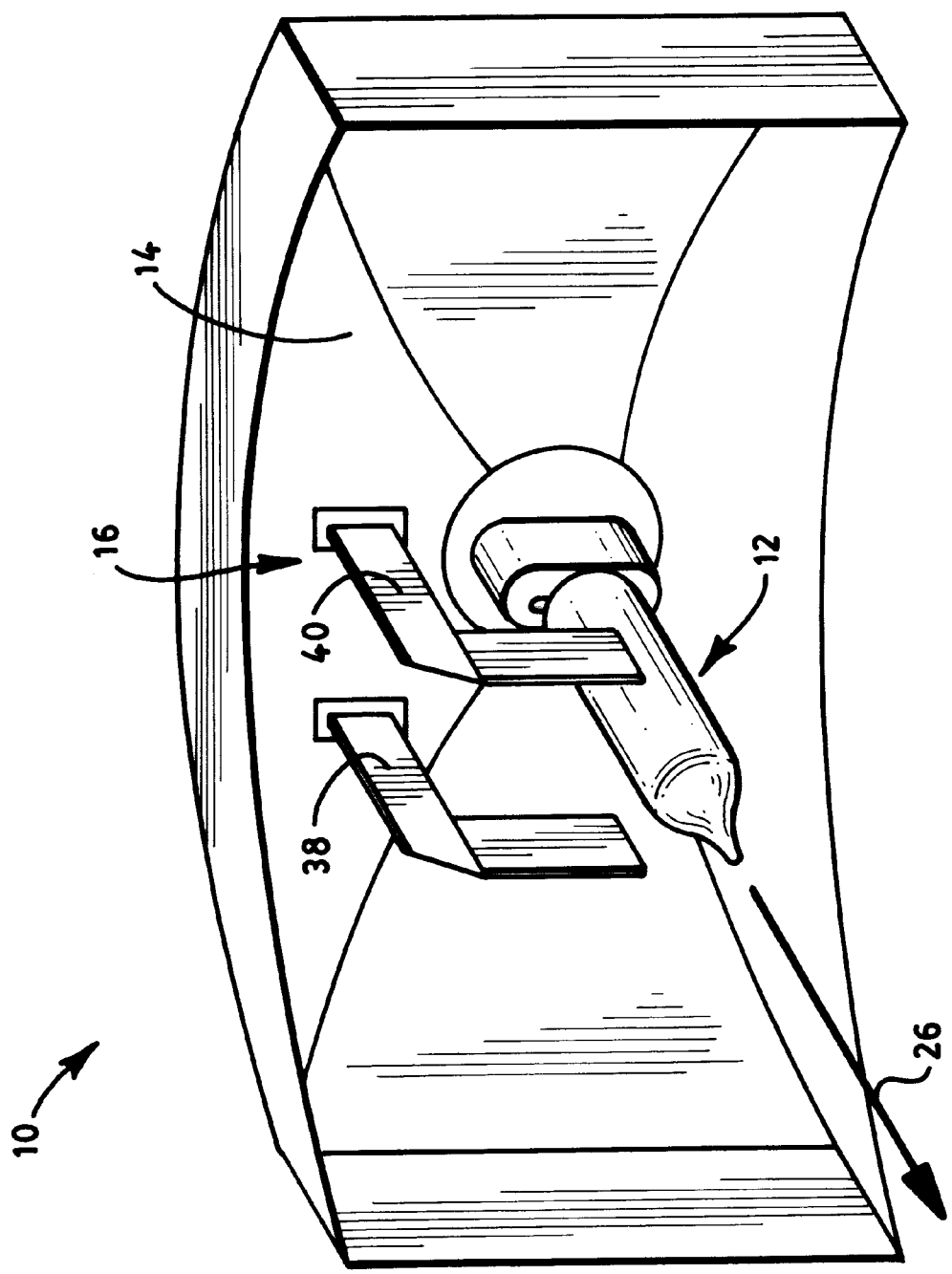
FIG. 1 shows a perspective front view of a preferred embodiment of a horizontal vehicle HID lamp with magnetic deflection.
Figure 2:
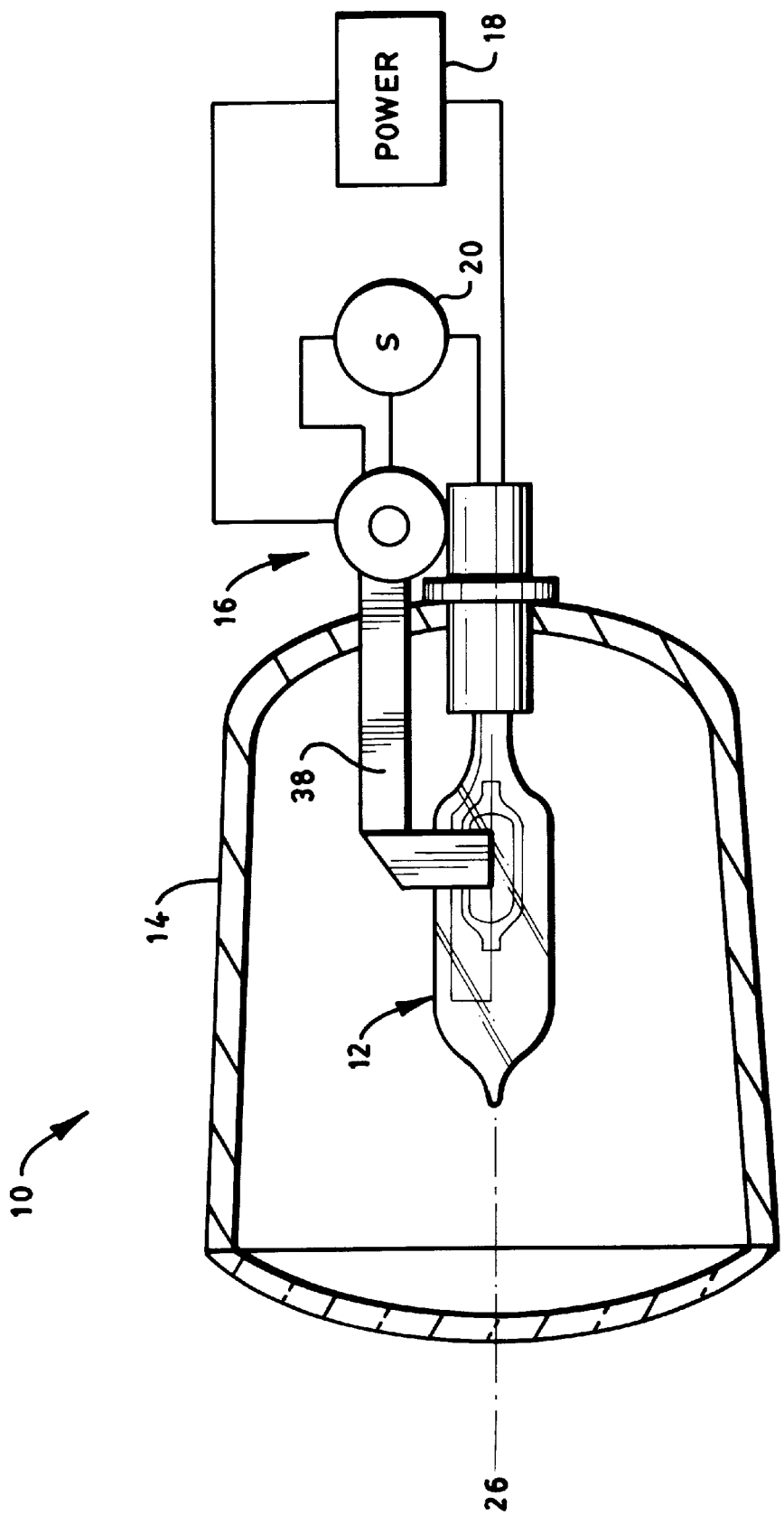
FIG. 2 shows a side cross sectional view of a preferred embodiment of a horizontal vehicle HID lamp with magnetic deflection, with a schematic circuit.

FIG. 1 shows a perspective front view of a preferred embodiment of a horizontal vehicle HID headlamp 10 with magnetic deflection. FIG. 2 shows a side cross sectional view of the preferred embodiment of a horizontal vehicle HID lamp with magnetic deflection, with a schematic circuit. The direct current HID headlamp with magnetic deflection 10 is assembled from a miniature high intensity discharge (HID) lamp 12, a vehicle headlamp reflector 14, an electromagnet 16, a power supply 18 and optionally a switch 20. The direct current deflection yoke passes through the reflector 14 to extend toward the arc formed inside the discharge lamp 12. The magnetic coil, wiring and electronics may be located behind the reflector. Direct current magnetic deflection of an HID lamp only needs a magnetic field that is proportional to the arc current. With an appropriate reflector, the movement of the arc can be shifted between optical focal regions for the low beam and the high beam modes.

Figure 3:
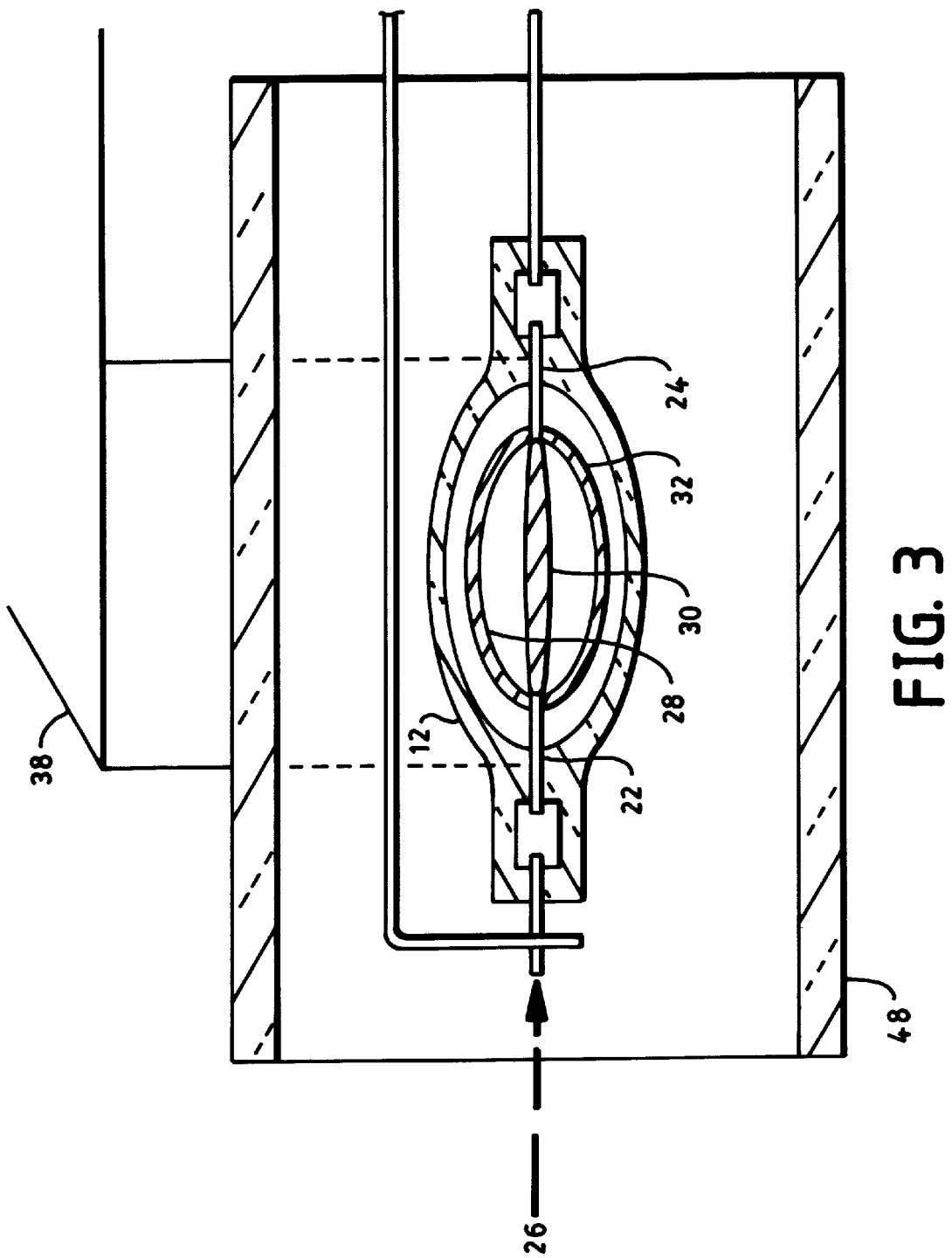
FIG. 3 shows a vertical, axial, cross sectional view of the lamp capsule partially broken away.

FIG. 3 shows a cross sectional view of the lamp capsule partially broken away. Three arc positions are shown, although in operation only one is possible at a time. Any intermediate position is possible depending on the magnitude of the magnetic field. The preferred lamp is a horizontally operated, miniature arc discharge lamp 12 with a first electrode 22 and a second electrode 24. The electrodes are preferably horizontally positioned along a lamp axis 26. The preferred miniature high intensity discharge (HID) lamp 12, may be any of numerous designs. The preferred embodiment is a double ended press sealed quartz body defining an enclosed volume of about 0.025 cubic centimeters, having a metal halide fill. Alternatively, the lamp may be a single ended lamp. The preferred lamp has an approximately ellipsoidal interior with a fairly open access around the electrode roots. The open geometry provides a better internal convective flow pattern particularly when the arc is magnetically deflected. The arc discharge lamp 12 without magnetic deflection normally provides a discharge position, normal arc 28, generally extending along an upward bowing line between a single tip end of the first electrode 22 and a single tip end of the second electrode 24. The interior dimensions of the enclosed volume are chosen to provide sufficient volume that the arc may be moved between preferred optical focal regions to form a proper low beam for a vehicle in one focal region 30 and a proper high beam in a second focal region 32. In a first state of magnetic deflection, the lamp may provide an axially centered arc in a first focal region 30. In a second, higher state of magnetic deflection, the lamp may provide a downward bowing arc in a second focal region 32.

Positioned around the arc discharge lamp 12 is a cavity type reflector 14. The reflector 14 is optically prescribed to provide a low beam headlamp pattern from a light source in a first focal region 30 for the reflector 14, and may additionally provide a high beam pattern from a light source sufficiently displaced from the first focal region 30 to a second focal region 32. It is understood that arc discharges provide a spatially extended light source, and the reflector 14 may be designed to produce a beam pattern from such an extended source. In one example, the horizontally operating arc was vertically deflected by the electromagnet from a first focal region 30 by about 2 millimeters to a second focal region 32. A combined vertical and lateral offset may also be used. Light received from the first region 30 was then projected by the reflector 14 to meet a known low beam pattern specification. Light received from the second region 32 was then projected by the reflector 14 to meet a known high beam pattern specification.

Vehicle headlamp reflector designs are commonly used with two filament tungsten halogen capsules, such as those designed for the 9007 tungsten halogen capsule. Such two filament reflector designs generally are formulated to accommodate parasitic, interfering reflections from the second filament. The second filament in such a lamp then appears to be on at a low level due to the reflection of light from the first filament. This tends to blend the high beam and the low beam patterns, and therefore requires greater light source separation to achieve an acceptable beam pattern. While there are no parasitic reflections in a magnetically adjusted arc lamp 12, there may be some overlap of the mantel areas between the two arc positions when centered respectively on focal regions 30, and 32. The relative light source displacement needed to adequately separate the high and low beam patterns by the reflector is approximately the same for two filamented and for magnetically deflected discharge lamp systems. It is then within the skill in the art of reflector design to make a headlamp reflector to produce high and low beam patterns for a magnetically deflected arc source deflected magnetically by as much as 2.0 millimeters. The required arc deflection depends on the optical reflector design.

Figure 4:
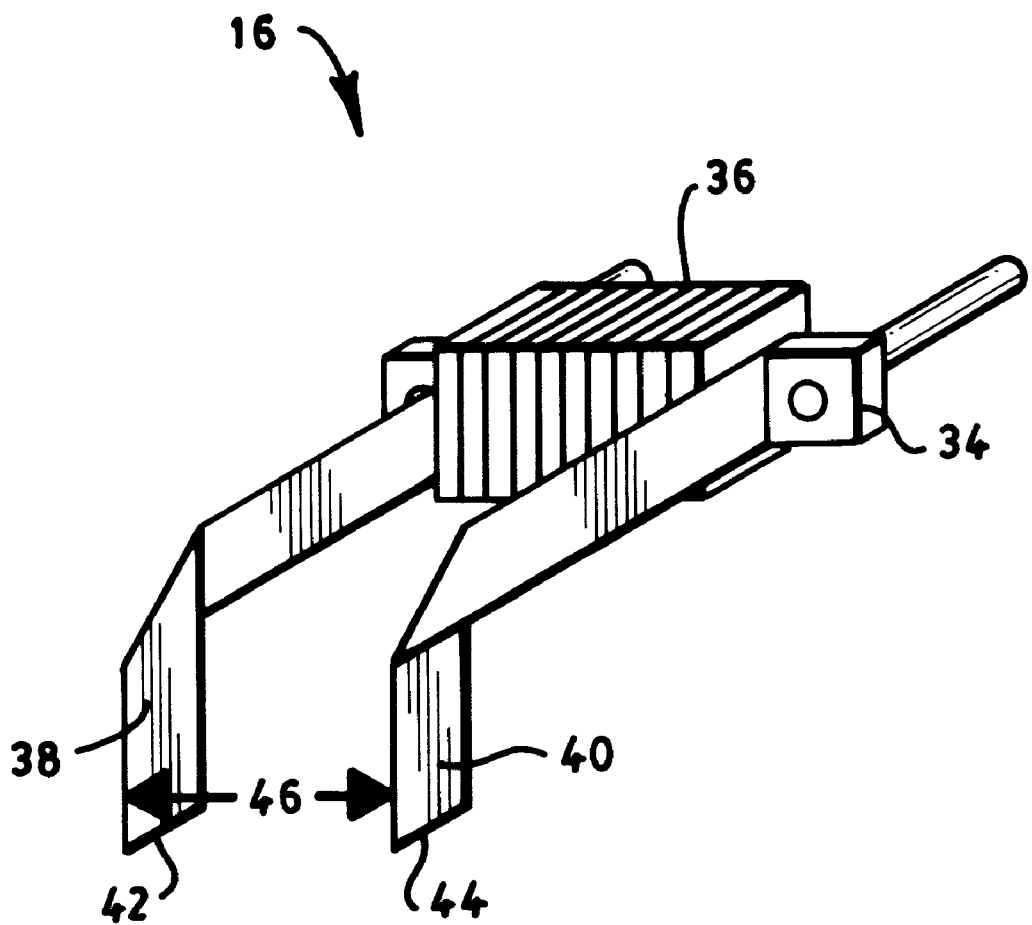
FIG. 4 shows an electromagnet assembly for a vehicle headlamp.

FIG. 4 shows an electromagnet assembly for a vehicle headlamp. An electromagnet 16 is preferably coupled in series with the lamp 12 and positioned relative to the arc discharge to provide an arc deflecting magnetic field capable of being deflected from a first focal region 30 to a second focal region 32. The preferred electromagnet 16 includes a core 34, a coil 36 and two pole pieces 38, 40.

There are many possible core geometries. The preferred core 34 is made of a straight bar of magnetic metal to act as a magnetic field conductor. A metal, for example iron, bar is commonly used. A silicon steel material was selected with a permeability approximating that of soft iron ($\mu$=1000) but with no conductivity to support eddy effects.

An alternative core design used a soft iron rod (1 centimeter diameter) bent to an elliptic shape having a small gap formed in one of the longer side portions. The free ends of the core then faced each other across the gap. The gap was sufficiently wide to receive an arc lamp 12 with the arc horizontal, and aligned perpendicular to the magnetic lines between the free ends of the magnet. It should be understood that the electromagnet may be made without a core, but that such air core magnets require more current, more turns or must be placed closer to the lamp to provide an equivalent field.

Positioned around the core 34 is a coil 36 to induce the magnetic field to be conducted by the core 34. The preferred coil 36 is an insulated wire, or similar electrically conductive coil 36. The coil 36 may be constructed with additional taps, so magnetic fields of differing strengths may be induced by switching the same input power between differing taps of the coil 36. In the alternative, a single coil 36 may be used, and the amount of power through the coil 36 may be switched to induce the differing field strengths. Combinations of these methods may be used.

A direct current magnetic deflection system may use several thousand coil turns on the core to provide a sufficient magnetic field, while using relatively little operating current. By coupling the electromagnet in series with the lamp, the arc current and magnet currents are proportional. By adjusting the number of coil turns, a degree of arc deflection may then be set that is fixed despite changes in lamp current due to the supply system. The magnetic field necessary to cause deflection for the small HID lamp 12 is about 30 Gauss or 3.0 mT. For the characteristic dimensions of one system, the number of ampere-turns needed to position the arc in the axially centered position 30 was calculated to be 675 ampere-turns. Assuming a 0.25 ampere average operating current, the system then needed about 2700 turns.

Pole pieces may be attached to the core ends to guide and concentrate the magnetic field. The pole pieces can then be conveniently lead through the lamp housing to extend the ends to approach the lamp exterior (See FIGS. 1, 2, 5, 6, 7). The design uses two electromagnet pole pieces 38, 40 placed to the left and right of the lamp 12. Coupled at the ends of the core 34, are two pole pieces 38, 40 that serve as magnetic field conductors. The pole pieces 38, 40 carry and direct the magnetic field induced by the core 34 and the coil 36. The pole pieces 38, 40 extend to pole ends 42, 44. In the preferred alignment, the pole ends 42, 44 end approximately in the horizontal plane of the first focal region 30 on either side of the lamp. The magnetic field region between the pole ends 42, 44 then effectively includes the arc region 28, and focal regions 30, and 32. The preferred magnetic field is then located roughly in a horizontal plane and transverse to the axis 26. This concentrates the magnetic field on axial region between the electrode tips (first focal region 30). The preferred faces of the pole ends 42, 44 extend axially parallel to the first focal region 30 to form a magnetic field that covers the length of the arc and the first focal region 30 with a fairly even magnetic field.

Figure 5:
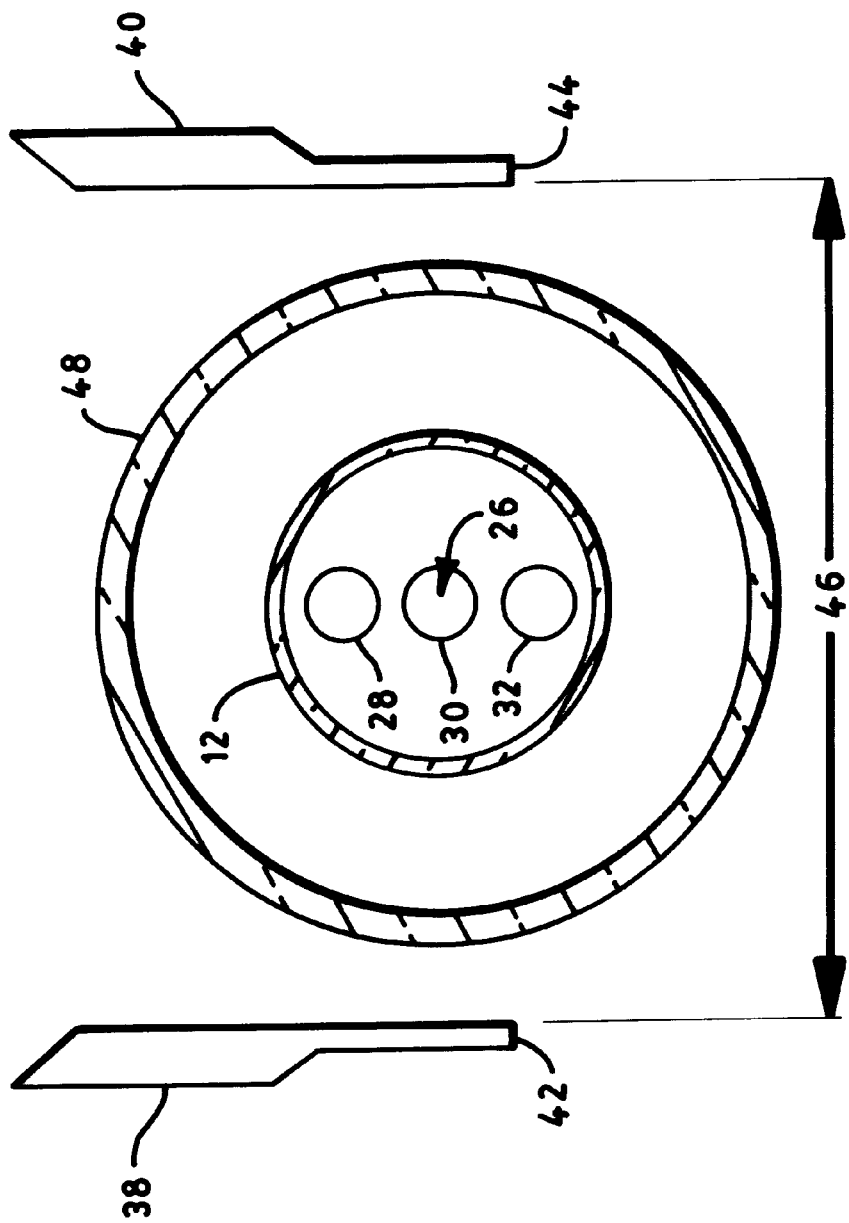
FIG. 5 shows a cross sectional view perpendicular to the lamp axis and through the lamp capsule and magnetic poles.

FIG. 5 shows a cross sectional view perpendicular to the lamp axis and through the lamp capsule and magnetic poles. The dimensions of the pole pieces 38, 40 are dictated in part by the HID lamp 12. The preferred pole ends 42, 44 have a width that exceeds the electrode tip to electrode tip discharge length to achieve an approximately homogeneous magnetic field along the whole axial length of the arc region 28 and the first focal region 30. The electrodes are about 4 millimeters apart, so a one (1) centimeter width for the pole piece ends 42 and 44 provides good magnetic field coverage of the arc region. The gap 46 between the pole ends 42, 44 has to be wider than the lamp thickness, which is about 2 centimeters (including the protective outer tube 48).

To limit optical interference it is preferred that the pole pieces 38, 40 be efficient magnetic field conductors with small projected surfaces with respect light source. The pole pieces 38, 40 then cast less shadow, and generate less glare by reflection. This may be achieve by having the poles 38, 40 generally extend in planes co-planar with the lamp axis or the arc. It is understood that, since the arc is shifted transverse to the magnetic field it is not possible to position the pole pieces exactly in planes parallel to the arc for multiple deflected arc positions. For the ends 42 and 44 of the pole pieces 38, and 40 to be in the horizontal plane of the arc, and to extend in a plane parallel to the lamp axis, the pole pieces 38, 40 must be in the horizontal plane. The pole pieces may lead out to the sides of the reflector, or may curve to the back through the reflector to be coupled to the core.

Figure 6:
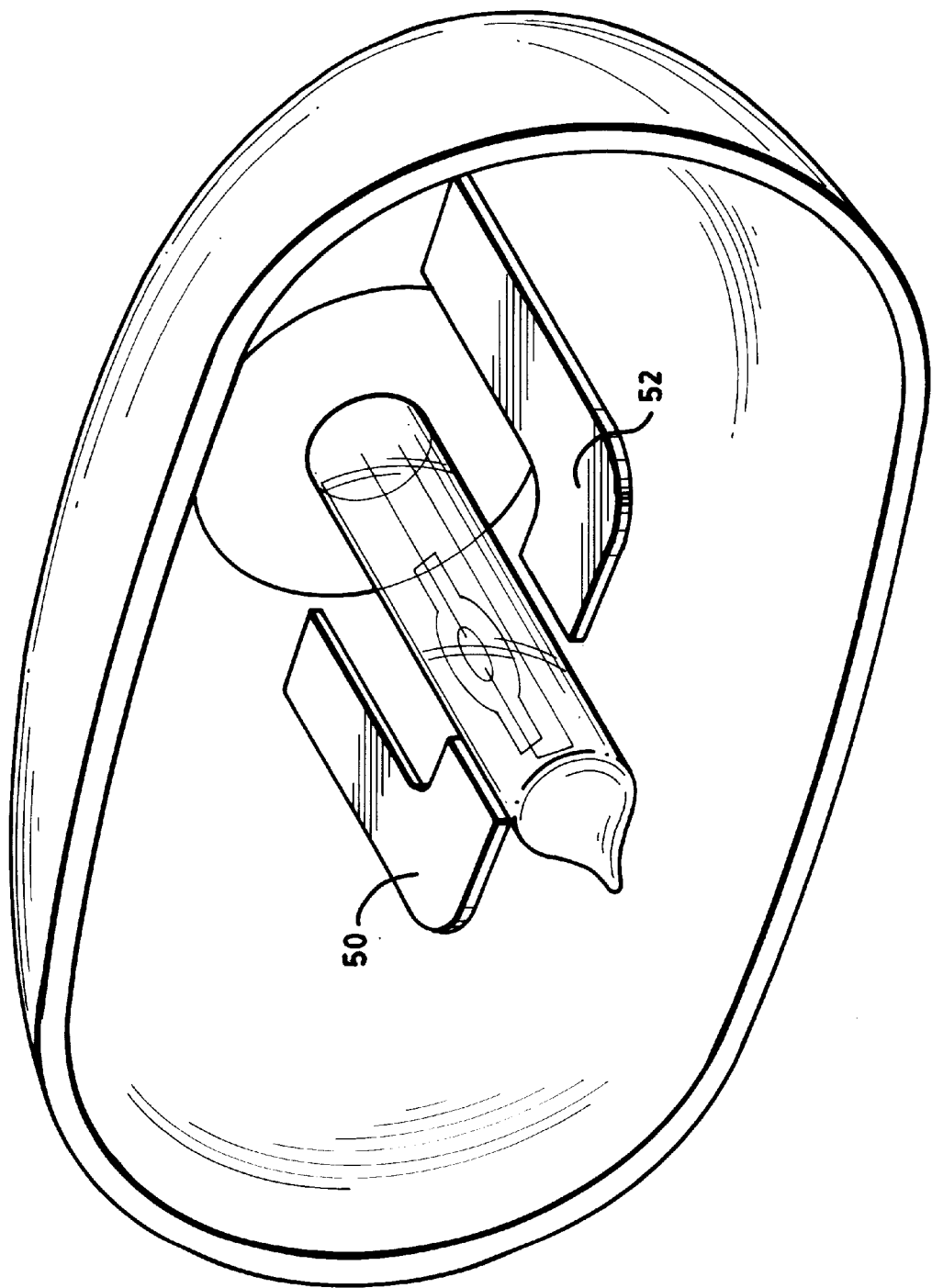
FIG. 6 shows a front view of an alternative headlamp reflector, with an alternative pole position.

FIG. 6 shows a front perspective view of an alternative headlamp reflector. The exposed ends of the pole pieces 50, 52 have the form of flat L shaped pieces extending from the rear of the reflector in the horizontal plane of the lamp capsule. The poles 50, 52 then straddle the lamp capsule with the pole ends pointed towards the lamp capsule. The widths of the pole ends are somewhat wider in the axial direction than the arc gap is long.

Figure 7:
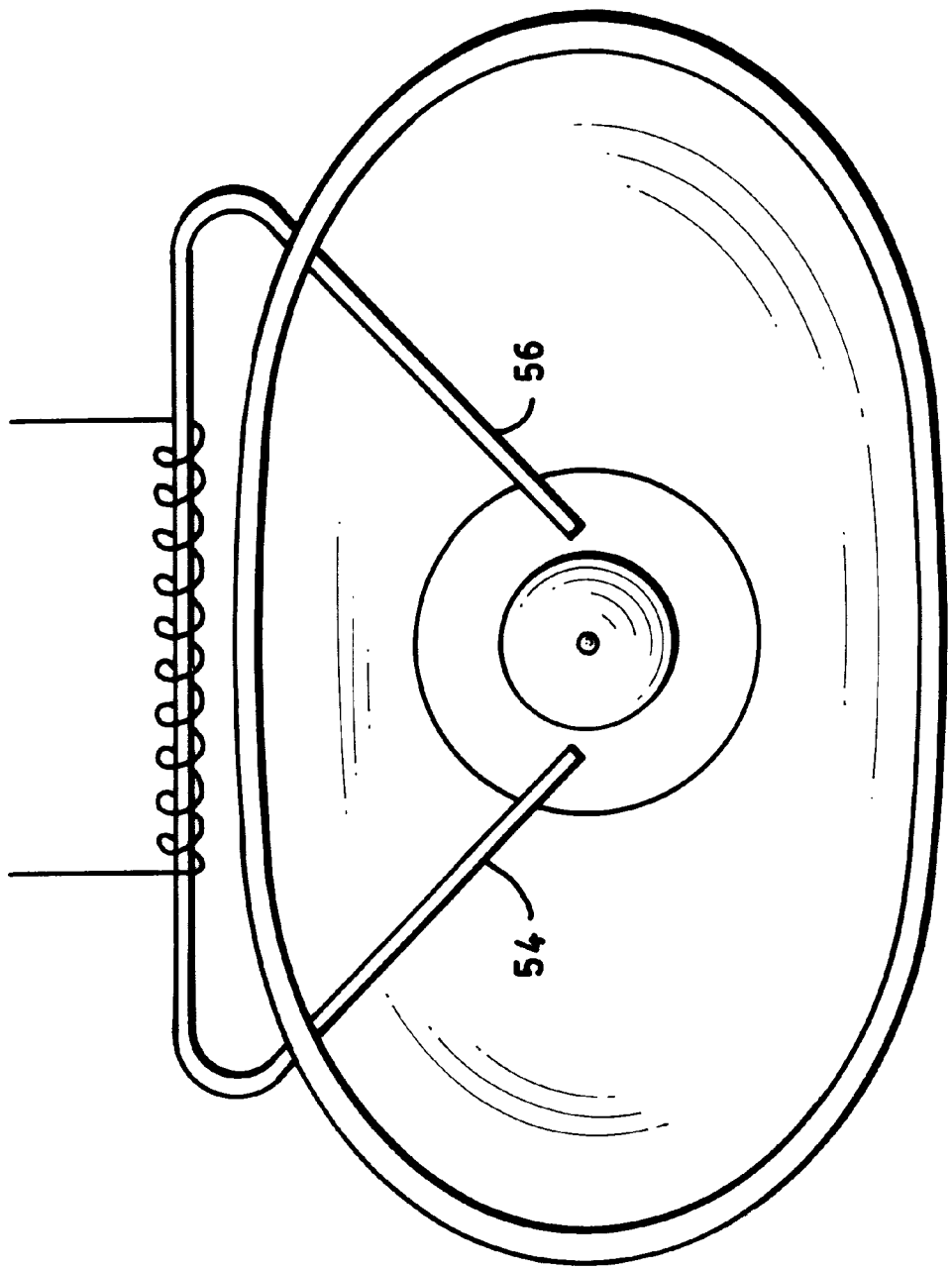
FIG. 7 shows a perspective front view of a reflector, with alternative pole position.

The most efficient reflector regions for generating vehicle headlamp beam pattern are generally the 90 degree quadrants centered on the horizontal plane and extending outward on both sides of the lamp capsule. To avoid optical interference with these regions, the pole pieces 38, 40 may be rotated (up or down) to extend roughly along the planes co-planar with the horizontal, exterior edge of the lamp capsule and at a sufficient angle to the horizontal to not interfere with the best beam generating regions of the reflector. An angle of 45 degrees to the horizontal is suggested. FIG. 7 shows a front view of an alternative reflector with pole pieces 54, 56 extending from the top wall of the reflector and downward at a 45 degree angle towards the side edge of the lamp capsule. The pole ends are again approximately in the horizontal plane of the arc. The preferred side quadrants of the reflector are then nearly free of any shadow cast by the pole pieces. The preferred pole pieces 54, 56 also pass in front of relatively less important parts of the reflector, in this case the upper region.

Figure 8:
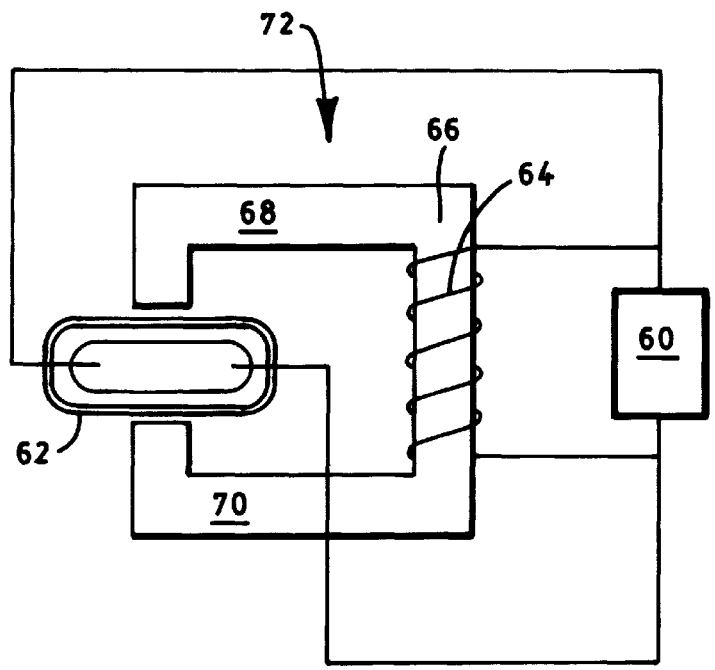
FIG. 8 shows a schematic circuit for direct current, continuous magnetic deflection of an HID vehicle lamp.

FIG. 8 shows a schematic circuit for direct current, continuous magnetic deflection of an HID vehicle lamp. A power supply 60 provides direct current to both the lamp 62, and to the coil 64. The coil 64 generates a magnetic field in the core 66 that is transferred by the poles 68, 70 to cross through the lamp 62. The power source 60 provides the same direct current power to power the lamp 62 and to power the electromagnet 72 assembly (64, 66, 68, 70). The electromagnet 72 then provides sufficient continuous magnetic field force with the first power state, so the arc is positioned at the first focal region, such as region 30, which may be for example axial alignment. The relative electric and magnetic field effects are then coordinated, and variation in the power source 60 then does not effect the arc position. The arc can be sustained in a continuously deflected position.

Figure 9:
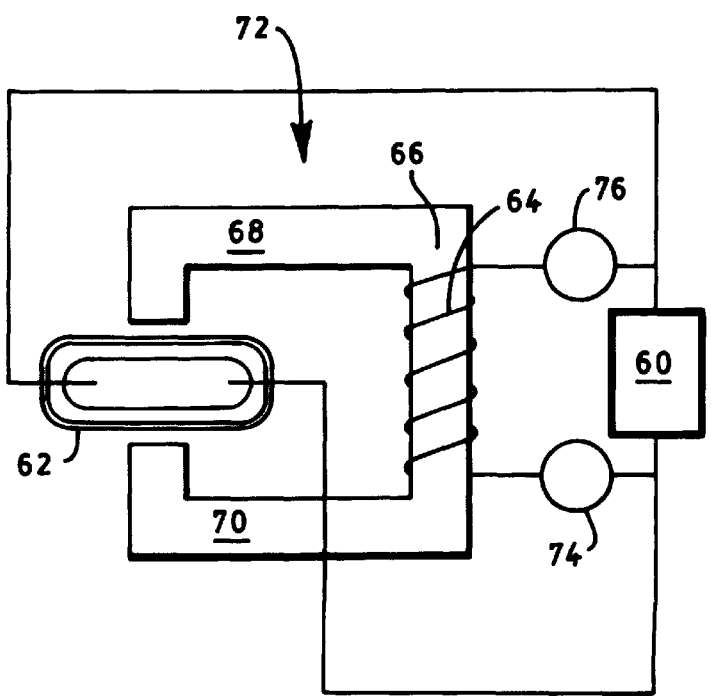
FIG. 9 shows a schematic circuit for direct current, continuous magnetic deflection of an HID vehicle lamp, with an adjustable magnetic field.

To achieve multiple positions for the arc, such as 30 and 32, (FIGS. 3, 5) the relative power of the magnetic field must be changed with respect to the electric field for each arc position sought. FIG. 9 shows a schematic circuit for direct current, continuous magnetic deflection of an HID vehicle lamp, with an adjustable magnetic field. The power adjustment 74 may select between power levels provided to the electromagnet 72, and may take the form of a variable resistor, or similar power supply adjustment. The adjusted power supplied to the electromagnet 72 can then be changed between first and second direct current power states. The electromagnet 72 then may provide a continuous, albeit lesser, magnetic field force with the first power state. The first power level can then positioned the arc at the first focal region 30, for example a position on the lamp axis 26. The electromagnet 72 may further provide a continuous, albeit relatively greater, magnetic field force with the second power state, and the arc can then be positioned at the second focal region 32, for example a position deflected below the lamp axis 26. Optionally a second adjuster 76 may be included to first tune, or calibrate the magnetic deflection to achieve accurate a selected position, and then using the first adjuster 74 to switch between the first and second power states (for low and high beam patterns). There is an advantage to the variable power design. Adding the step of adjusting the first power level enables one to adjust (calibrate) the deflection of the arc discharge and as a result to adjust the angle of the projected beam to a preferred position. By this means, the beam may be horizontally leveled by tuning the power to the first level. Thereafter a fixed or proportionate amount of power is added to achieve the designed second level.

Figure 10:
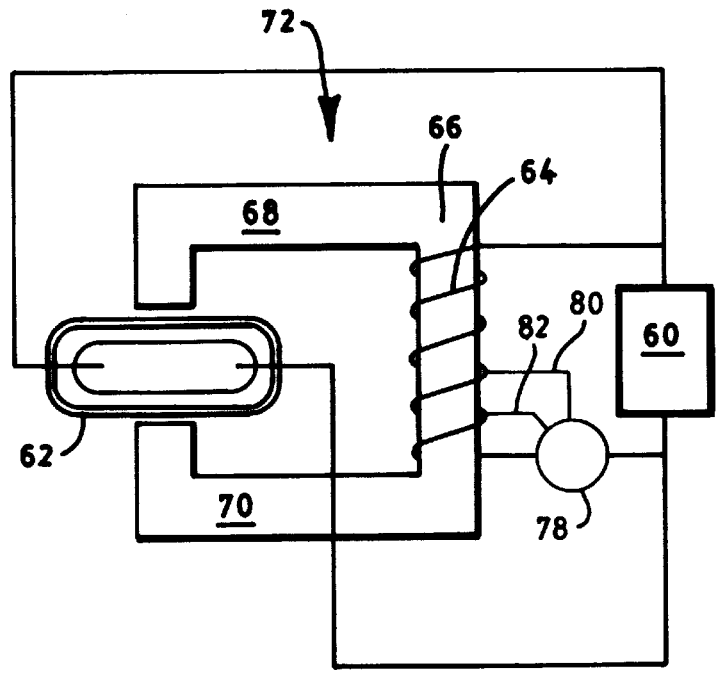
FIG. 10 shows a schematic circuit for direct current, continuous magnetic deflection of an HID vehicle lamp, with switched tap control of the adjustable magnetic field.

FIG. 10 shows a schematic circuit for direct current, continuous magnetic deflection of an HID vehicle lamp, with switched tap control of the adjustable magnetic field. Alternatively, a switching device 78 may be used for selecting between taps 80, 82, into the coil 64. A calibration adjustment may be also be added, as in FIG. 9.

Figure 11:
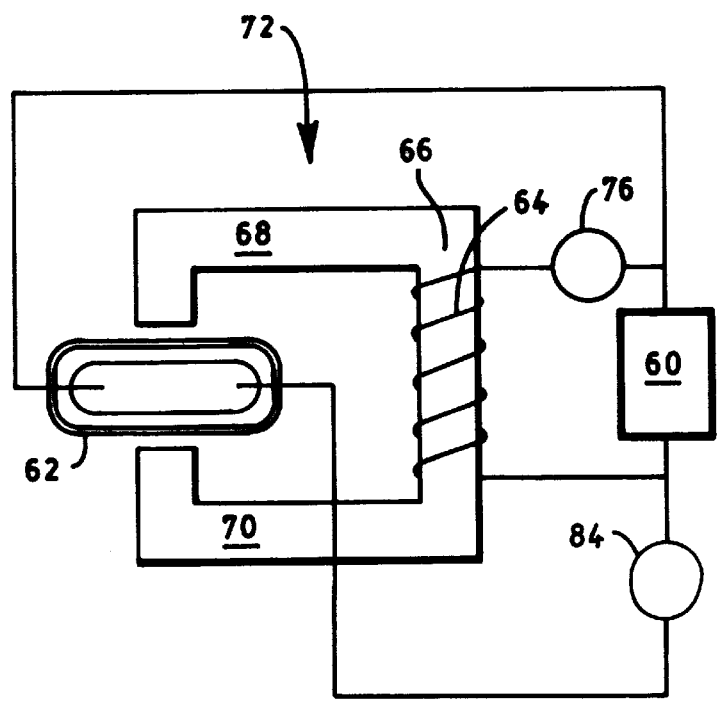
FIG. 11 shows a schematic circuit for direct current, continuous magnetic deflection of an HID vehicle lamp, with an adjustable electric field.

Since, it is the relative force balance that is important, a similar positioning result can be achieved by adjusting the power supplied to the lamp 62. FIG. 11 shows a schematic circuit for direct current, continuous magnetic deflection of an HID vehicle lamp, with an adjustable electric field. Adjuster 84 controls the lamp power, while optional adjuster 76 is for tuning or calibrating the position. Here the light level may be increased or decreased by the adjustment.

Figure 12:
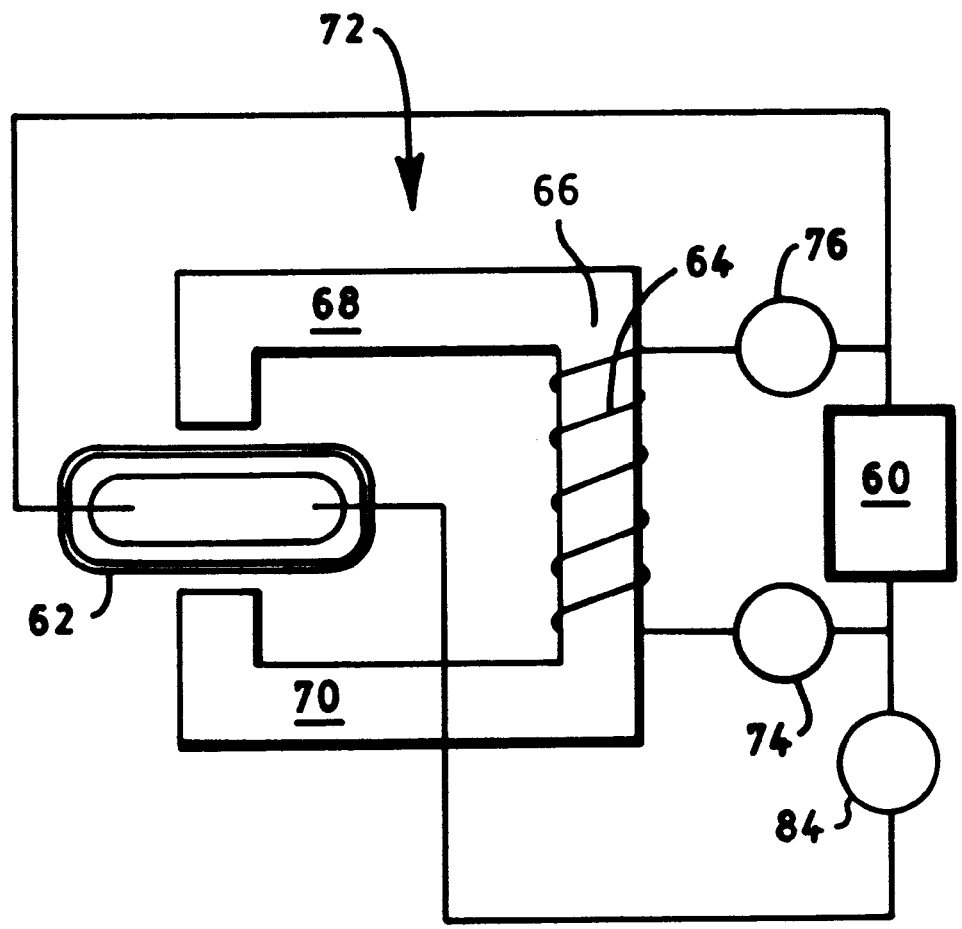
FIG. 12 shows a schematic circuit for direct current, continuous magnetic deflection of an HID vehicle lamp, with a tuned magnetic field, an adjustable magnetic field, and an adjustable electric field.

FIG. 12 shows a schematic circuit for direct current, continuous magnetic deflection of an HID vehicle lamp, with a tuned magnetic field, an adjustable magnetic field, and an adjustable electric field. The circuit in FIG. 12. allows the magnetic deflection to be tuned to proper position by adjuster 76, switched between first and second (or intermediate) power states by adjuster 74, while adjusting light output by adjuster 84. This scheme could be used to provide low, high, and daylight running operating conditions all from one lamp 62. It should be understood that a variety of combined arc positioning and arc luminance control patterns are anticipated in actual use, and more sophisticated adjustment mechanisms are expected.

It should be understood that use of the upper and lower arc positions may be reversed to satisfy optical design preferences for high and low beam sources, and that right and left deflections may be included for optical design convenience. The right and left deflections may be achieved by rotating the pole pieces somewhat around the lamp axis to locate the poles ends out of the horizontal plane. Alternatively, a second magnetic field source and associated pole pieces may be included where the second set of pole pieces are positioned above and below the lamp axis 26 to generate a magnetic field with a vertical field component extending through the arc region. The arc may then be moved to a variety of predetermined locations (up, down, right, left, up right, down left, etc.)

The preferred method of operation is to run the lamp 12 in at least one of the power states such that the arc is continuously magnetically deflected while in that power state. Continuous magnetic deflection enables the arc to be offset from the envelope wall. It is understood that rapid pulsing or moderately varying of the magnetic fields may be applied while achieving substantially the same continuously deflected result. Alternating current designs require an electromagnet that switches the magnetic field orientation in synchrony with the electric field. This is possible where the frequency is slow, or the response time of the electromagnet is quick. In all of these cases, the arc would remain substantially deflected in a sufficiently stabile position, or changed between two or more deflected positions to enable an acceptable beam for vehicle operation.

Continuous magnetic deflection has been found to increase lamp 12 efficiency, and improve lamp 12 life. Being continuously deflected while under both power states is therefore the more preferred method of operation. Ideally, in a first power state, the arc may be centered on the lamp axis 26 for low beam positioning. The low beam position may be centered elsewhere, but the greatest advantage occurs when there is separation between the envelope wall and the mantel of the arc. Since low beam operation is more frequent, the preferred system design is to improve low beam lamp 12 efficiency, and lamp endurance by locating the low beam arc position to be axially aligned, offset from the envelope wall. The magnetic field also straightens the arc, providing a better optical source for constructing a low beam pattern, usually the more difficult case.

The continuous operation of the magnetic field has a number of beneficial effects. First the arc is better defined for optical purposes, being straighter and brighter. The low beam pattern is usually optically more demanding to form, so it is convenient to use the optically simpler axially aligned source as the design input for the low beam. Second, the magnetically deflected arc has also been found to have less vertical color separation. This appears to be the result of mixing the fill components, particularly the sodium, in the arc better, and perhaps constraining these components more to the arc core. As a result of the better mixing, and the arc being constrained to a straightened position, the lamp under continuous magnetic deflection appears to be 25 to 35 percent more efficient than a lamp of the same structure and power that is run without continuous magnetic deflection. This was a wholly unexpected benefit of arc deflection.

The arc is also constrained from bending upwards towards the envelope wall. The upper lamp wall temperature is then substantially lower than that in a similarly sized arc lamp with no magnetic deflection. The magnetic field fights the connective flow, and gravity effects that would otherwise sweep the arc upwards towards the envelope wall. The magnetic deflection field also keeps the scandium, sodium and similar metal components from impacting the envelope wall. Impact erosion, and heat evaporation of the envelope wall effectively have the same result on lamp life. Magnetically deflecting the arc to a stabile lower position then limits the destructive results of an arc position stabilized by an adjacent envelope wall. The wall temperature governs the silicon reaction with the fill materials, which in turns effects the chemical and melting aspects of the electrode. By reducing the wall temperature, the electrodes can be made to last longer. The magnetically stabilized arc lamp can then have substantially increased life, and may maintain a more stabile chemistry and consistent color for a longer period.

In the preferred method of high beam operation, both the arc and magnet currents are increased to increase arc power and to bring the arc down to the second focal region 32, closer to the lower wall. This moves the arc out of the ideal (axial) position for the low beam optic. Despite the increased arc power to increase arc luminance, the arc in the high beam position is then even farther from the top wall, and so the high beam lamp life can be enhanced.

Several variations are considered relevant. First the single arc lamp capsule can provide both high and low beam operation (two lamps for the price of one.) Secondly, continuous variation from the low beam position to the high beam position is possible. This enables several degrees of high beam. Next, beam leveling may occur by beam electronics, and without mechanical movement of the light source, reflector or housing. The applicants have used variable resistor in the magnetic circuit to tune the arc position and thereby level the beam position. High and low beam switching is then additional to the beam truing adjustment. It is believed that ordinary skill in the electronics art is needed to add an adjustment to the base deflection current for the magnet power to achieve adjustable beam leveling. It was also suggested that not only could the high beam be the result of the magnet deflecting the arc into the correct optical position, the lamp power has been increased for more light, and the beam further deflected by increased magnetic field. The high beam can then be achieved by re-locating the arc location in the capsule so that it falls on the focal region for the high beam optics, which is also chosen to be the arc region where the greatest luminance occurs. Another variation is to change the arc power from the first power level while simultaneously adjusting the magnetic deflection to maintain the arc in the first position. By this means a higher luminance low beam can be formed for better foreground illumination, as a fog lamp or other purposes. Similarly, and more importantly, a lower power low beam can be formed. This has been achieved by lowering the arc power while again magnetically maintaining the proper arc position. As a result a day light running beam was achieved with less light output (energy saving) while maintaining the correct beam position. Circuitry for balancing between the arc power, and magnetic deflection, and for switching between chosen patterns of performance are considered easily with the skill of electronic arts, and are consider more a matter of designer choice given the patterns of performance to be implemented.

In a working example, the structure and the method of operation were carried out with the conditions approximately as follows: The lamp had a 3 millimeter inside diameter, and a 5 millimeter outside diameter. The gap between the electrode tips was chosen to be about 4 millimeters. The inside diameter, perpendicular to the electrode axis was about 3 millimeters. The larger inner diameter (compared to a standard 2.5 millimeter lamp) provided a greater vertical range for arc deflection, and resulted in a more pronounced arc deflection for the same magnetic field. The lamp envelope had a more open, or ellipsoidal internal cathode end geometry than was normally used. The open geometry provided a better convection pattern resulting in a better redistribution of the lamp file (condensate). The total lamp dosage was 1.5 milligrams of a standard metal halide lamp fill. With higher fill dosages, downward deflection of the arc can become unstable as the arc stirs the additional condensate with increasing deflection. The lamp was operated at 35 watts. A commercially existing vehicle DC HID lamp ballast was used to operate the miniature HID lamp. The reflector used during testing was a production model with a complex optical design intended for use with a 9007 dual axial filament lamp.

In the preferred embodiment, the electromagnet comprised a core wrapped with a wire coil, and two pole pieces. The core had a stack of five (5) layers of silicon steel transformer laminations. Each steel layer was 57 millimeters by 7 millimeters by 1.2 millimeters. Around the core were wrapped 2700 turns of wire giving an overall dimension of 28 millimeters by 20 millimeters by 17 millimeters. The coil ends were electrically coupled to the vehicle high beam low beam switch, and powered by between 125 (low beam) and 250 (high beam) milliamperes of direct current. For road testing the electromagnet was powered by a current regulator. The core extended at each end beyond the coil, exposing core ends to which the two pole pieces were riveted. The pole pieces were made of silicon steel transformer laminations. Each pole piece had dimensions of 87 millimeters by 12 millimeters by 0.5 millimeters. The pole pieces extended forwards in a vertical plane about two-thirds of their length. The pole pieces were then folded at a 45 degree angle to extend straight downwards about one third of their overall length. The free ends of the pole pieces were then located in the horizontal plane of the arc on either side of the HID lamp capsule. The electromagnet was positioned so the core and coil were behind a vehicle reflector, and the pole pieces extended through slots formed in the reflector. The pole pieces then extended to terminate on either side of the lamp capsule. Powering the coil then induced a magnetic field that was directed by the pole pieces to form a magnetic field that was approximately horizontal and through the lamp capsule. The magnetic coil leads were coupled to a current regulator, that was in turn coupled to the existing high beam low beam switch. The headlamp switch provided continuous power to the coil leads while the lamp was on, and therefore provided a continuous deflection of the arc away from the upper wall of the lamp capsule. The current to the coil leads was between 125 and 250 milliamperes. During low beam operation the magnetic field deflected the arc downwards into a nearly axially straight position. Switching to high beam, the coil current was increased, thereby producing a greater downward deflection of the arc.

Because the arc is magnetically positioned to be held away from the wall, there is less interaction between the arc materials and the wall. There is less absorption, chemical reaction and other forms dosage loss over the life of the lamp. As a result, the dosage lamp may be reduced, from typical 2 milligrams to 1.5 milligrams. There is then less dosage condensate residing on the lamp wall screening the arc. More light emerges, and the view of the arc is clearer.

The disclosed operating conditions, dimensions, configurations and embodiments are as examples only, and other suitable configurations and relations may be used to implement the invention.

FIG. 12 shows a chart showing the change in integrated lumens as function of magnetic coil current. For zero coil amperes, the lamp without magnetic deflection produced about 1300 lumens. As the coil current was increased to 0.15 amps, the arc achieved a straightened shape, and the number of lumens produced increased to about 1490 lumens. This amounted to an increase of almost fifteen percent (15%) more lumens. Since the arc is straight, efficient optical design is easier to achieve. As a result the increase in the number of useful lumens is even higher.

With a further increase in coil current to 0.25 amps, the arc dipped below the straightened position, to a position useful in forming a high beam, but even then the lamp produced about 1350 lumens or almost four percent (4%) more lumens then in the undeflected position. This increase in light output occurs with further distancing of the arc from the envelope top wall, The lamp wear decreases even though the lumen output at high power increases.

To measure the lamp capsule and magnetic performance, they were placed in an integrating sphere. The actual spherical lumens was higher than reported since it was not possible to calibrate the sphere to account for the absorption by the gear driving the magnetic deflection (core, coil, etc.). The relative change in the lumen production is still believed to be accurate and indicates that the lamp is more efficient when the discharge is in one of the magnetically deflected lower positions, such as the straightened, centered position (arc located away from the envelope wall).

The increase in spherical lumens is believed to be related to both heat loss through the upper wall and improved convection which helps to mix the metal additives and increase the mantel region of the discharge. As FIG. 12 indicates, the improvement in lumen efficacy for the DC magnetically deflected lamp is manifested by an increase in the brightness and size of the discharge column.

Figure 13:
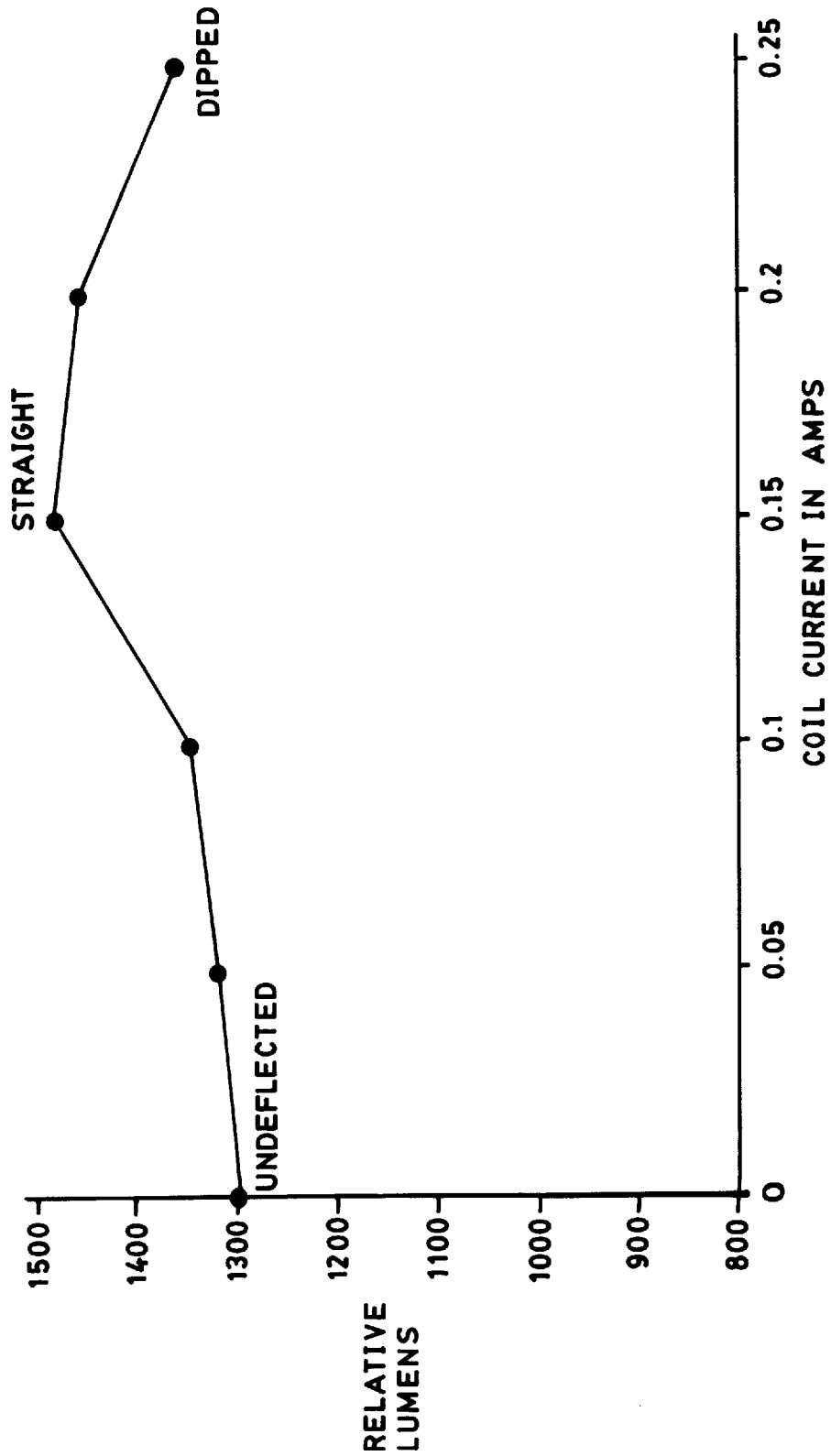
FIG. 13 shows a chart showing the change in integrated lumens as function of magnetic coil current.

FIG. 13 shows a chart showing the arc distribution in the discharge column as function of deflection position. In FIG. 13, the distribution of the discharge column is measured for three different arc positions. The ordinate measures the distance from the interior floor of the capsule. The abscissa measures foot candles. The data for the undeflected position (curve 86) is on the far right (highest in the capsule). The low beam deflected (axially straight) (curve 88) arc data is in the middle, and the high beam (maximally deflected or dipped) (curve 90) is on the left. The relative brightness and size of the discharge column increases as the magnetic field increases sufficiently to straighten the discharge column. Not only is the region of high intensity larger (curve 88 is relatively wider than curve 86), but also the peak intensity of curve 88 is higher than for curve 86. Total light is then increased, and more importantly, the optically best portion of the arc, the most intense zone, has about 26% more light. As the arc discharge is deflected below the horizontal, the brightness decreased, but the arc is well removed from the upper wall. The undeflected and maximum deflection distributions are affected by the proximity of the inner cavity wall which no doubt affects the heat balance and may cause some of the reduction in the luminous intensity. The continuous magnetic deflection then results in improved convection, better mixing of the fill materials, increased thermal efficiency, and a brighter core of the arc. This is not arc constriction, or arc narrowing as is commonly understood by practioners, but is an increased concentration of energy in the core fo the arc.

Figure 14:
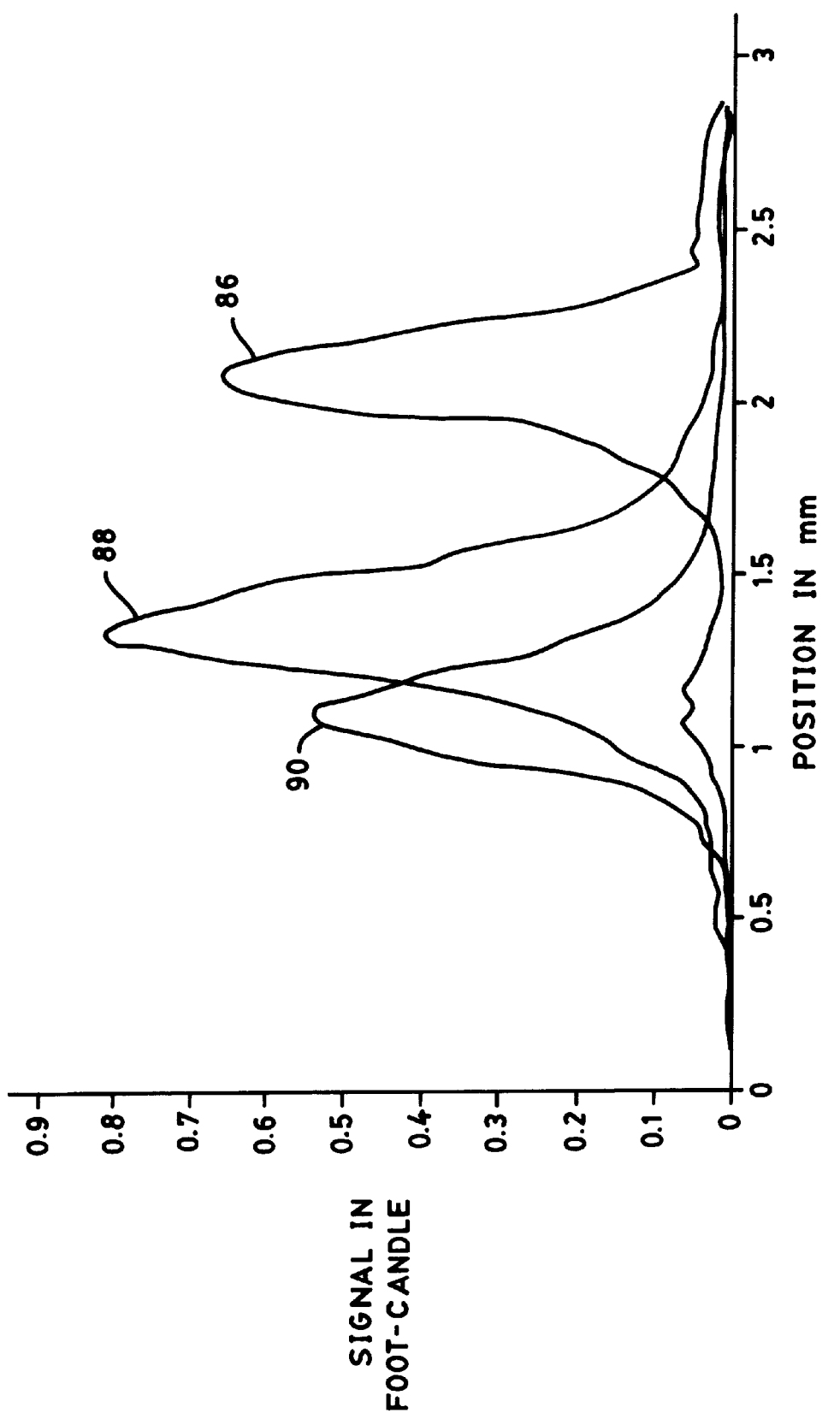
FIG. 14 shows a chart of foot candles showing the distribution in the discharge column as function of three deflection positions.
Figure 15:
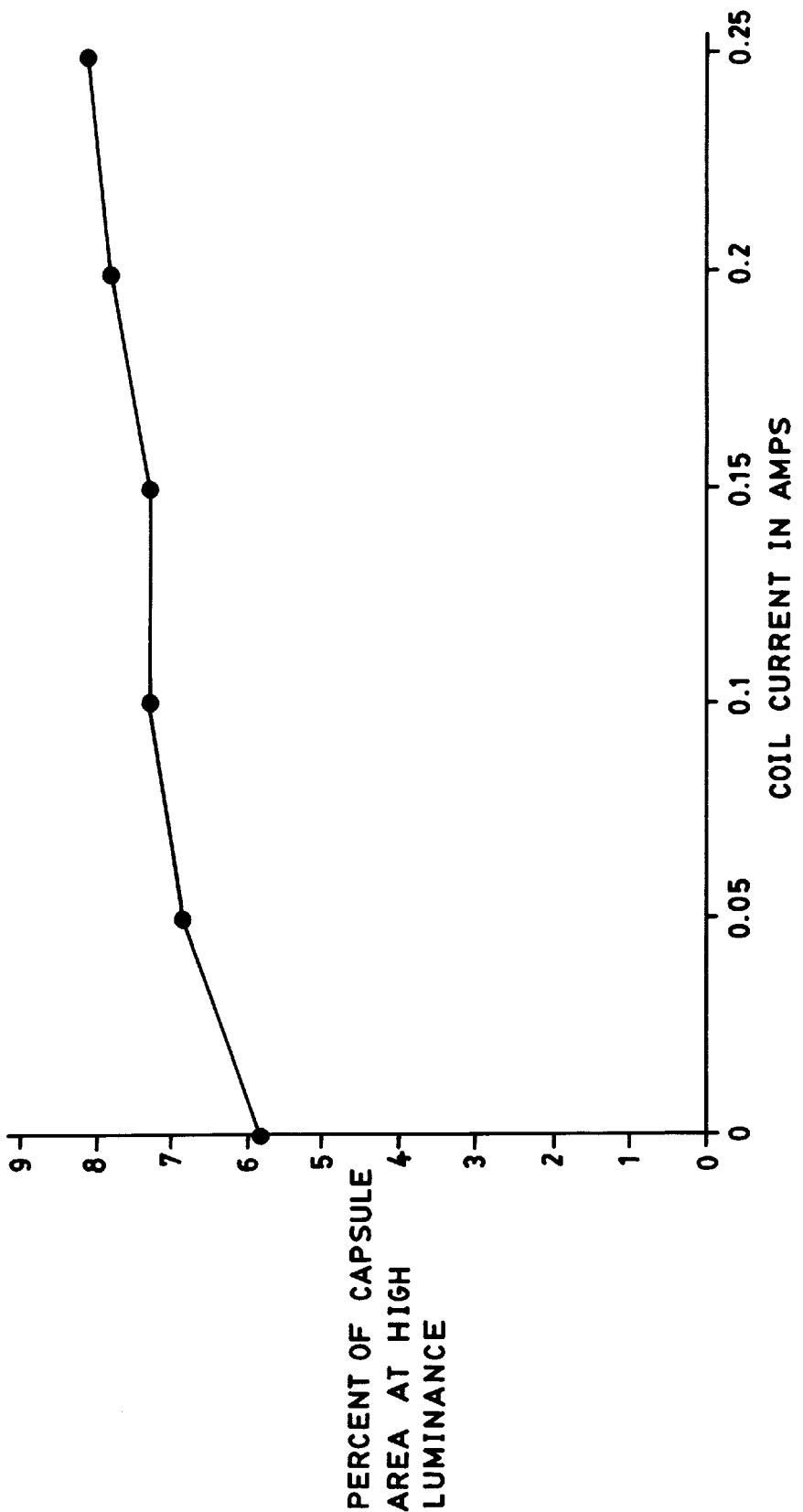
FIG. 15 shows a chart showing the percentage of the capsule at high luminance as a function of magnetic deflection current.

FIG. 14 shows a chart showing the percentage of the capsule at high luminance as a function of magnetic deflection current. For this measurement, the discharge is projected onto a screen and a video image made. The video image is then digitized for intensity and an integration over intensity values is made. FIG. 14 indicates that as the discharge is deflected away from the wall and straightened the area of the brightest portion of the discharge also increases. This indicates that some of the luminous gain is shared between an increase in the mantel and an increase in the discharge column brightness. What is important here is that a greater portion of the arc is at high luminance, and it is straightened. This improvement in arc shape is needed for better light delivery by the optics for horizontal images that form the beam and its control.

While there have been shown and described what are at present considered to be the preferred embodiments of the invention, it will be apparent to those skilled in the art that various changes and modifications can be made herein without departing from the scope of the invention defined by the appended claims. The magnetically deflected arc has a higher luminance value and this coupled with the optics is more preferred rather than having the two sources at lower luminance as in an alternating current lamp. For example the addition of a second set of magnetic poles may be added to create a horizontal deflection. The horizontal deflection may be in proportion to a second signal, such as a steering wheel displacement signal, so that the lamp may be steered right or left corresponding to actual driver actions.

What is claimed is:

1. A method of operating an arc discharge lamp having a narrow enclosed volume containing an arc generally extending horizontally between a first electrode and a second electrode, and an electromagnet positioned to provide a magnetic field substantially transverse to the arc path, the method comprising the steps of:

providing a first power level to sustain an arc discharge between the first electrode and the second electrode, and providing a second power level to the electromagnet to sustain, a magnetic field substantially continuously during the arc generation, the electromagnet being positioned relative to the arc to deflect the arc downwards to a first position.

2. The method in claim 1, further including the step of adjusting the second power level to deflect the arc discharge and as a result deflect the angle of a projected beam to a preferred position.

3. The method in claim 1, further including the step of locating a reflector having a high beam focal region to form a high beam pattern with respect to the lamp such that the high beam focal region of the reflector overlaps the arc position region in the lamp that produces a maximal lumen output in the high beam pattern.

4. The method in claim 1, further including the steps of changing the arc power from the first power level while simultaneously adjusting the second power level for the magnetic deflection to maintain the arc in the first position.

5. A method of operating a vehicle headlamp having an arc discharge lamp with an arc generally extending horizontally between a first single ended electrode and a second single ended electrode, a reflector optically prescribed to have a first focal region to provide a low beam headlamp pattern, and a second focal region, displaced from the first focal region to provide a high beam pattern, an electromagnet positioned to provide a magnetic field sufficient to deflect the arc from an undeflected position to the first focal region, and to shift the arc from the first focal region to the second focal region, and a switch to power the electromagnet comprising the steps of:

providing a first power state to operate the lamp for low beam operation, while providing continuous power to the electromagnet to deflect the arc to the first focal region, and providing a second power state to operate the lamp for high beam operation, while providing continuous power to the electromagnet to deflect the arc to the second focal region, and switching between the first power state and second power state as desired.

6. A method of operating a vehicle headlamp having a reflector, an arc discharge lamp having an envelope wall defining narrow enclosed volume containing an arc generally extending horizontally between a first electrode and a second electrode, and an electromagnet positioned to provide a magnetic field substantially transverse to the arc path, and a power supply, the method comprising the steps of:

providing a direct current power component to the lamp and to a first electromagnet providing a vertical deflection of the arc discharge, and a second electromagnet providing a horizontal deflection of the arc discharge, providing a first power to the lamp at a first current level to maintain the arc between the electrodes, and continuous power to the first electromagnet to deflect the arc to a vertical position below a horizontal axis extending between the first and second electrodes, and above the lamp wall, and providing continuous power to the second electromagnet to deflect the arc horizontally to a position between a vertical, axial plane and the lamp capsule wall; and switching to a second continuous power to the lamp at a second and higher current level, and providing a second power to the first electromagnet to deflect the arc to a vertical position to overlay the horizontal axis extending between the first and second electrodes, and providing a second power to the second electromagnet to deflect the arc horizontally to position to overlay the vertical, axial plane.

7. A vehicle headlamp comprising:

an arc discharge lamp with a first single ended electrode and a second single ended electrode, the arc discharge lamp providing an arc light source generally extending along a horizontal line between an end of the first electrode and an end of the second electrode;

a reflector positioned around the arc discharge lamp, the reflector being optically prescribed to provide a low beam headlamp pattern from a light source overlapping a first focal region, and to provide a high beam pattern from a light source overlapping a second focal region, an electromagnet positioned relative to the arc discharge to provide an arc deflecting magnetic field;

a power source providing a first direct current power state to power the lamp with the arc at the first focal region, the power source providing a second direct current power state greater than the first power state to power the lamp and to power the electromagnet, the electromagnet providing sufficient continuous magnetic field force with the second power state, and positioned relative to the arc to position the arc at the second focal region; and a switch to shift the power source from providing the first power state to providing the second power state.

8. A vehicle headlamp comprising:

an arc discharge lamp with a first single ended electrode and a second single ended electrode, the arc discharge lamp providing a light source generally extending along a horizontal line between an end of the first electrode and an end of the second electrode;

a reflector positioned around the arc discharge lamp, the reflector being optically prescribed to provide a low beam headlamp pattern from a light source overlapping a first focal region, and to provide a high beam pattern from a light source overlapping a second focal region, an electromagnet coupled in series with the lamp and positioned relative to the arc discharge to provide an arc deflecting magnetic field;

a power source providing a first direct current power state to power the lamp and to power the electromagnet, the electromagnet providing sufficient continuous magnetic field force with the first power state, and positioned relative to the arc to locate the arc at the first focal region, the power source also providing a second direct current power state greater than the first power state to power the lamp and to power the electromagnet, the electromagnet providing sufficient continuous magnetic field force with the second power state, and positioned relative to the arc to position the arc at the second focal region; and a switch to shift the power source from providing the first power state to providing the second power state.

9. The headlamp in claim 8, wherein the electromagnet includes pole pieces extending to ends located to define a magnetic field region between the pole ends, the magnetic field in the arc region being horizontal and transverse to the arc.

10. The headlamp in claim 9, wherein the pole pieces have a planar form parallel to the lamp axis.

11. A vehicle headlamp comprising:

an optical reflector with a first focal region;

an arc discharge lamp with a light transmissive wall defining an exterior and an enclosed volume, a first single ended electrode sealed through the wall to electrically connect from the exterior to the enclosed volume, a second single ended electrode sealed through the wall to electrically connect from the exterior to the enclosed volume, and a fill material comprising a metal halide located in the enclosed volume, the lamp being positioned with respect to the reflector such that the focal region is within a sphere defined by length extending between the electrode tips as a diameter of the sphere, a power supply providing a direct current power component;

an electromagnet positioned with respect to an arc discharge between the first electrode and the second electrode, and providing in a first state sufficient magnetic field strength to place the arc on a first path through the focal region, and providing in a second state sufficient magnetic field strength to place the arc on a second path not through the focal region, and a switch to operate the electromagnet in the first state, and the second state.

12. The headlamp in claim 11, where in the first path is substantially intersected by a vertical plane containing the first electrode tip and the second electrode tip.

13. The headlamp in claim 11, where in the second path is substantially on a side of a vertical plane containing the first electrode tip and the second electrode tip.

14. The headlamp in claim 11, where in the first path extends substantially along a line connecting the first electrode tip, and the second electrode tip, and the second path is substantially on a side of a vertical plane containing the first electrode tip and the second electrode tip, and below a horizontal plane containing the first electrode tip and the second electrode tip.

15. A vehicle headlamp comprising:

an optical reflector with a first focal region;

an arc discharge lamp with a light transparent wall defining a horizontally elongated, enclosed volume, having an inside diameter of between 4 and 10 millimeters, an axis extending from a first end to a second end, with an internal axial length of from 6 to 12 millimeters, and a first single ended electrode, sealed to extend through the wall at the first end, a second single ended electrode, sealed to extend through the wall at the second end, positioned such that an internal end of the first electrode is horizontally offset from an internal end of the second electrode by about 4 millimeters, and a power supply providing electric power in a first condition sufficient to start and maintain an arc between the internal end of the first electrode and the internal end of the second electrode, electric power including a direct current power component;

and sufficient in a second condition to have an increased DC power component;

a first electromagnet electrically coupled in series with the first electrode, and positioned to deflect the arc discharge between the first electrode and the second electrode, in the first condition downward to offset the arc from the lamp wall, and offset the arc from the first focal region, and in the second condition downward to offset the arc from the wall, and to overlay the first focal region; and a second electromagnet electrically coupled in series with the first electrode, and positioned to deflect the arc discharge between the first electrode and the second electrode in the first condition horizontally to offset the arc from the lamp wall, and offset the arc from the first focal region, and in the second condition horizontally to offset the arc from the wall, and to overlay the first focal region.

16. The lamp system in claim 15, where in the reflector has a reflector positioned around the arc discharge lamp, the reflector being optically prescribed to provide a low beam headlamp pattern from a light source overlapping a first focal region, and to provide a high beam pattern from a light source overlapping a first focal region, such that the deflection of the arc by about 1.5 millimeters from the first focal region to the second focal region alters the beam pattern from a legal low beam to a legal high beam.

17. The lamp in claim 15, wherein the first and second electromagnets are induce magnetic fields in the second condition to position the arc in substantially a straight line between the first electrode and the second electrode.

18. The lamp in claim 15, wherein the second condition includes an increase in the current applied between the first and the second electrodes.

19. The lamp in claim 15, wherein the pole pieces have the form of flat L shaped pieces extending from the rear of the reflector in the horizontal plane of the arc, the poles ends straddle the lamp capsule with the pole ends pointed towards the lamp capsule.

20. The lamp in claim 15, wherein the pole pieces extend through the top wall of the reflector and downward at a 45 degree angle towards the lamp capsule.

21. The lamp in claim 19, wherein the pole ends have widths that are wider in the axial direction than the arc gap is long.

22. The lamp in claim 20, wherein the pole ends are in the horizontal plane of the arc.

* * * * *